Dec. 29, 1953

W. A. RAY
AUTOMATIC VALVE OPERATING IN RESPONSE
TO TEMPERATURE CHANGES 2,664,246

Filed Jan. 3, 1949

WILLIAM A. RAY,
INVENTOR.

BY John Flann
ATTORNEY

Dec. 29, 1953     W. A. RAY     2,664,246
AUTOMATIC VALVE OPERATING IN RESPONSE
TO TEMPERATURE CHANGES

Filed Jan. 3, 1949     7 Sheets-Sheet 2

WILLIAM A. RAY,
INVENTOR.

BY John Flam

ATTORNEY

Dec. 29, 1953  W. A. RAY  2,664,246
AUTOMATIC VALVE OPERATING IN RESPONSE
TO TEMPERATURE CHANGES
Filed Jan. 3, 1949  7 Sheets-Sheet 3
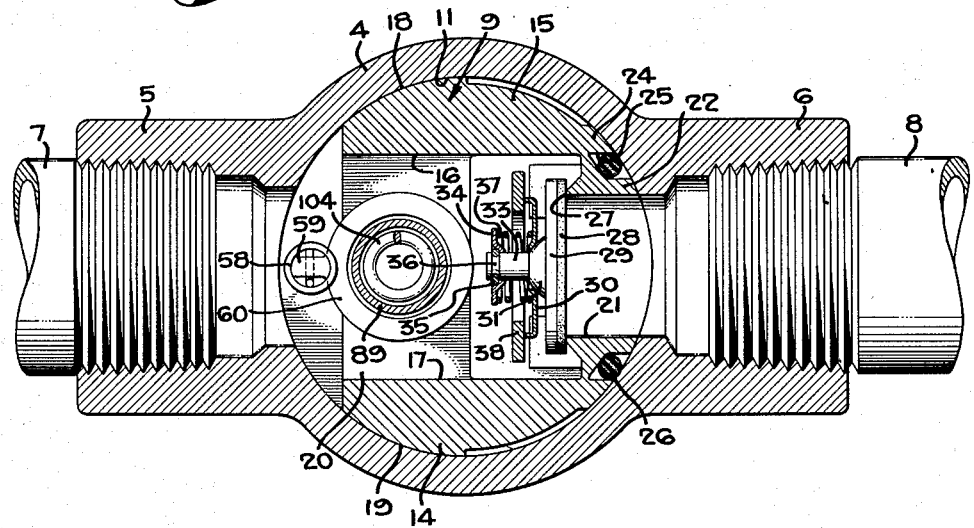
Fig. 3.
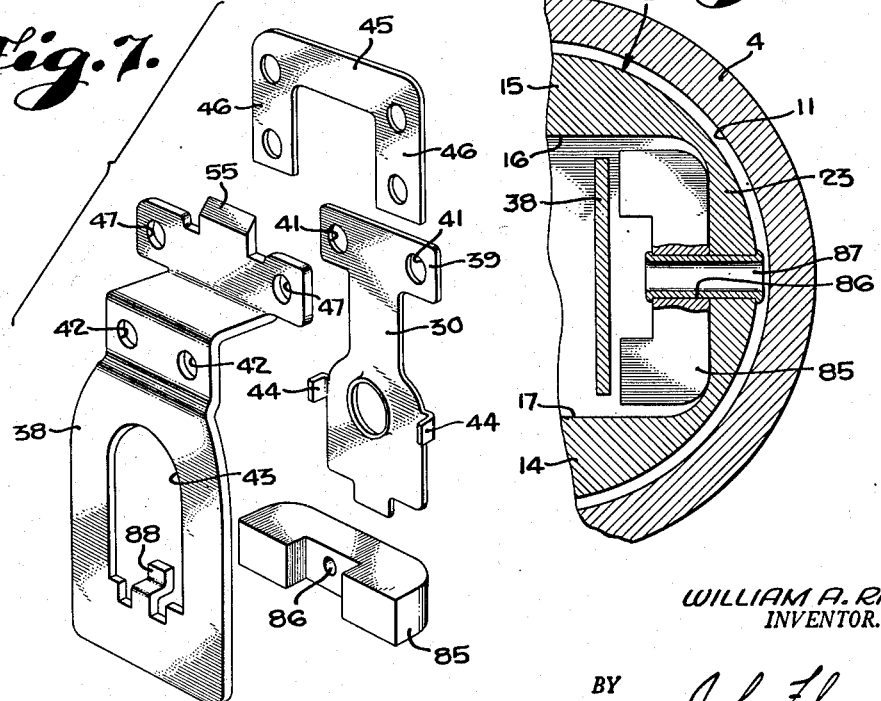
Fig. 7.
Fig. 6.
WILLIAM A. RAY,
INVENTOR.
BY John Flam
ATTORNEY Dec. 29, 1953

W. A. RAY 2,664,246

AUTOMATIC VALVE OPERATING IN RESPONSE TO TEMPERATURE CHANGES

Filed Jan. 3, 1949

WILLIAM A. RAY,
INVENTOR.

BY John Flam

ATTORNEY

Dec. 29, 1953 W. A. RAY 2,664,246
AUTOMATIC VALVE OPERATING IN RESPONSE
TO TEMPERATURE CHANGES
Filed Jan. 3, 1949 7 Sheets-Sheet 6
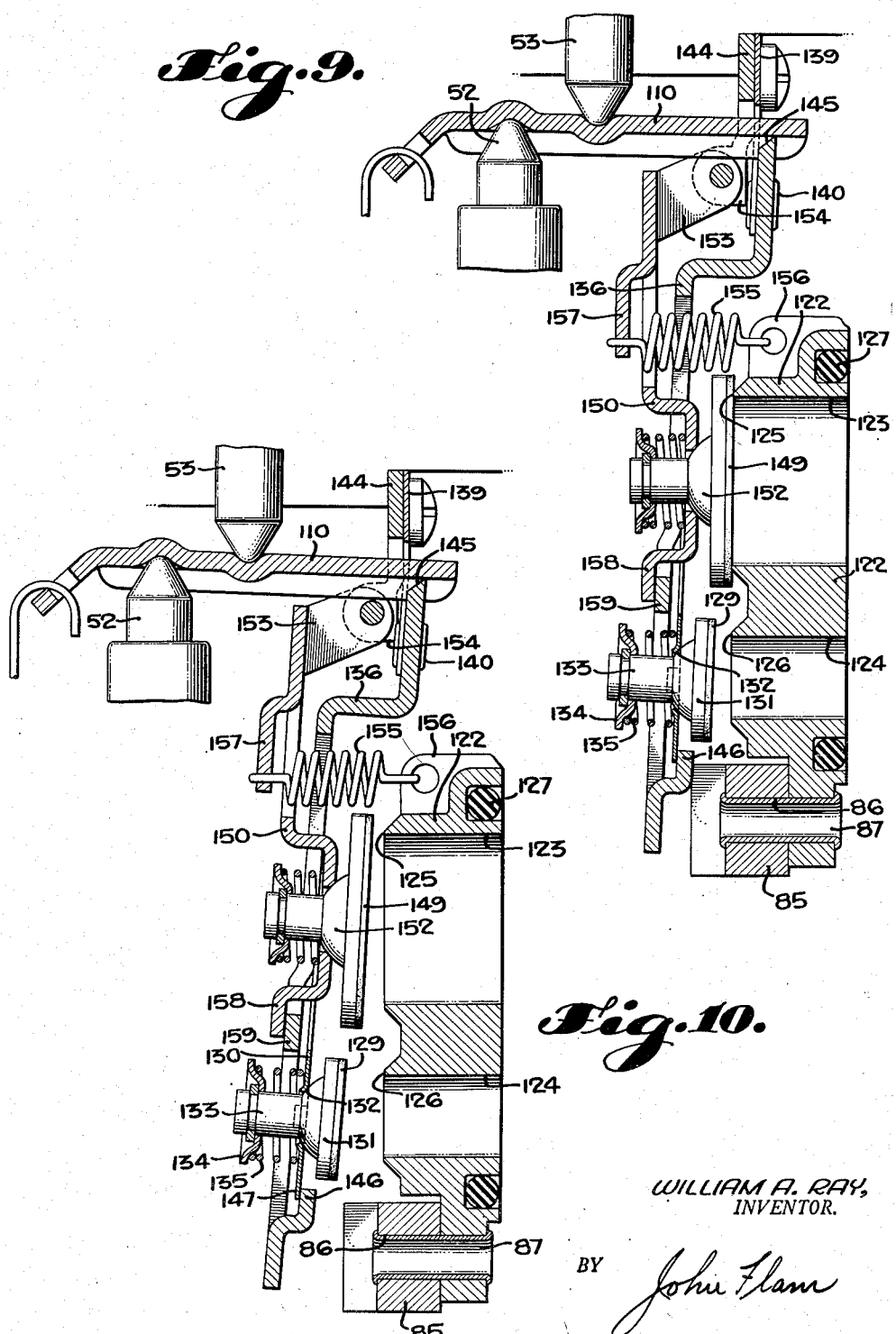
WILLIAM A. RAY,
INVENTOR.
BY John Flam
ATTORNEY

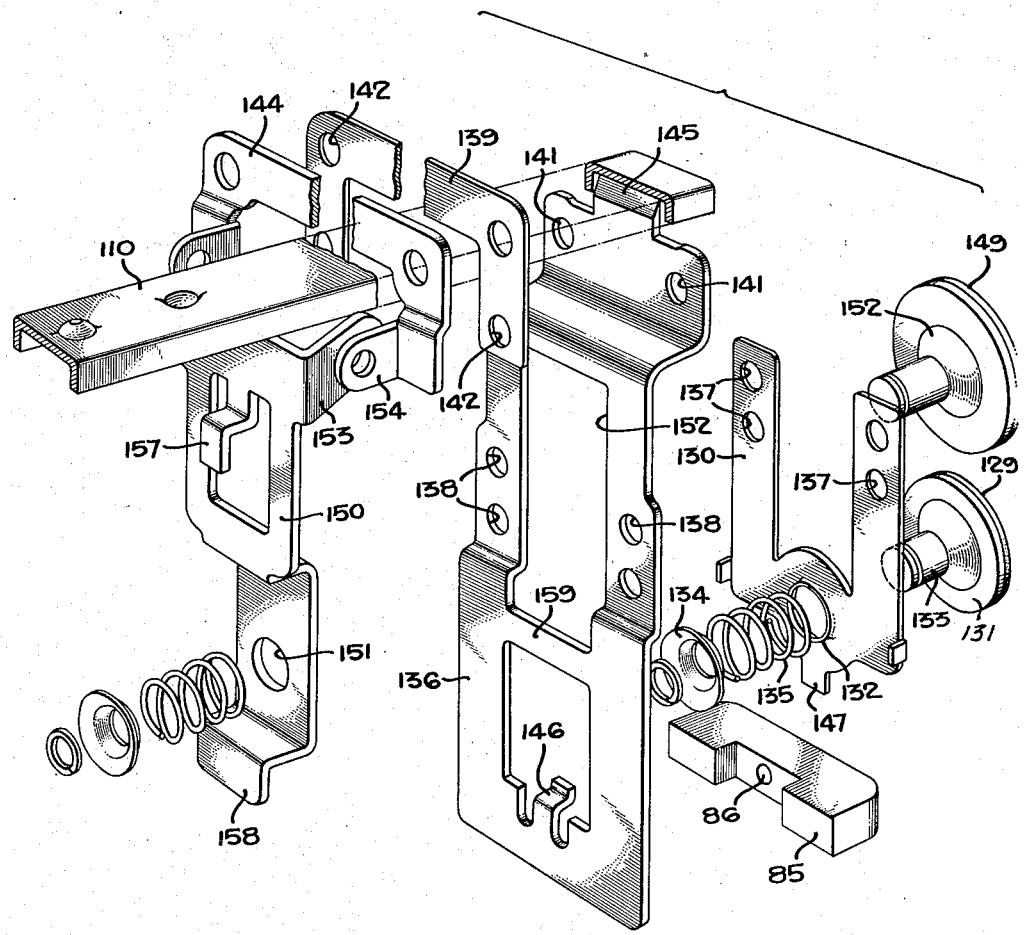

Patented Dec. 29, 1953

2,664,246

UNITED STATES PATENT OFFICE 2,664,246

AUTOMATIC VALVE OPERATING IN RESPONSE TO TEMPERATURE CHANGES

William A. Ray, North Hollywood, Calif., assignor to General Controls Co., a corporation of California Application January 3, 1949, Serial No. 68,896

18 Claims. (Cl. 236—99)

This invention relates to a valve for the control of a fluid medium, such as fuel or a refrigerant, and responding to a condition, such as temperature.

Valves of this general character, in which the closure is operated by a device that is mechanically effected by heat, are now well known. For example, hot water heaters having gas burners are often equipped with an expansion rod, or the like, for mechanically regulating the flow of fuel to the burner. Similarly, an expanding bellows has been used for controlling the refrigerant to an expansion coil of a refrigerating system.

It is one of the objects of this invention to improve, in general, devices of this character.

When the temperature of a space is controlled from a remote point, as by the aid of a feeler bulb filled with a volatile medium, an expanding and contracting corrugated bellows is utilized; and the bellows and the bulb form a sealed space for the medium. Since the bellows and the bulb are separated by a substantial distance, the circumambient temperature at the bellows may be different from that at the feeler bulb. This temperature differential would cause inaccuracy in the temperature control.

It is another object of this invention to compensate for such temperature differentials, and especially by the provision of a compensating bimetallic arrangement.

The limiting differentials of temperature for opening and closing the valve are quite close, of the order of 2° Fahrenheit. Accordingly, it is essential to test and adjust the various elements quite carefully. It is another object of this invention to make it possible to perform these adjustments in a convenient manner, and especially by arranging all of the working parts on a support or cage that may, after testing, be inserted as a unit into the valve casing.

When the flow of fuel to a burner is controlled by a valve, a rise in temperature to an upper limit causes the valve closure to seat. The seating force is light, since it is primarily due to the expansion of a bellows or of an expansion rod. It is another object of this invention to ensure that the valve closure will engage the valve seat without dragging the valve closure across the seat. In this way, such light seating forces can be effective to secure a perfect seal.

It is still another object of this invention to maintain the valve closure in fully seated position under pressure until it is opened by a snap action. Due to such an arrangement, the pressure seating the closure does not continuously progress from full pressure to zero pressure; and, thus, any tendency to leak, before the valve is finally opened, is entirely obviated.

It is still another object of this invention to limit the amount of closing pressure on the closure. The operator is thus precluded from exerting a pressure that might distort the valve seat or cause the valve closure to adhere to the seat.

It is still another object of this invention to provide a combination high-low fire valve incorporating the above features, and in which the low fire valve is opened with a snap action, and the high fire valve is used as a throttle valve.

This invention possesses many other advantages, and has other objects which may be made more clearly apparent from a consideration of several forms in which it may be embodied. Such forms are shown in the drawings accompanying and forming part of the present specification. These forms will now be described in detail, illustrating the general principles of the invention; but it is to be understood that such detailed description is not to be taken in a limiting sense, since the scope of the invention is best defined by the appended claims.

Referring to the drawings:

Fig. 3 is a sectional view, taken along plane 3—3 of Fig. 1;

Fig. 6 is an enlarged fragmentary sectional view, taken along plane 6—6 of Fig. 1;

Fig. 7 is a pictorial view of an arm that carries the valve closure, together with some of the cooperating parts;

Fig. 9 is an enlarged fragmentary sectional view, showing a stage of operation of the valve structure illustrated in Fig. 8;

Fig. 10 is a view similar to Fig. 9, but of a succeeding stage of operation;

Fig. 11 is a pictorial exploded view of the valve operating parts embodied in the valve structure shown in Fig. 8;

Figure 1:
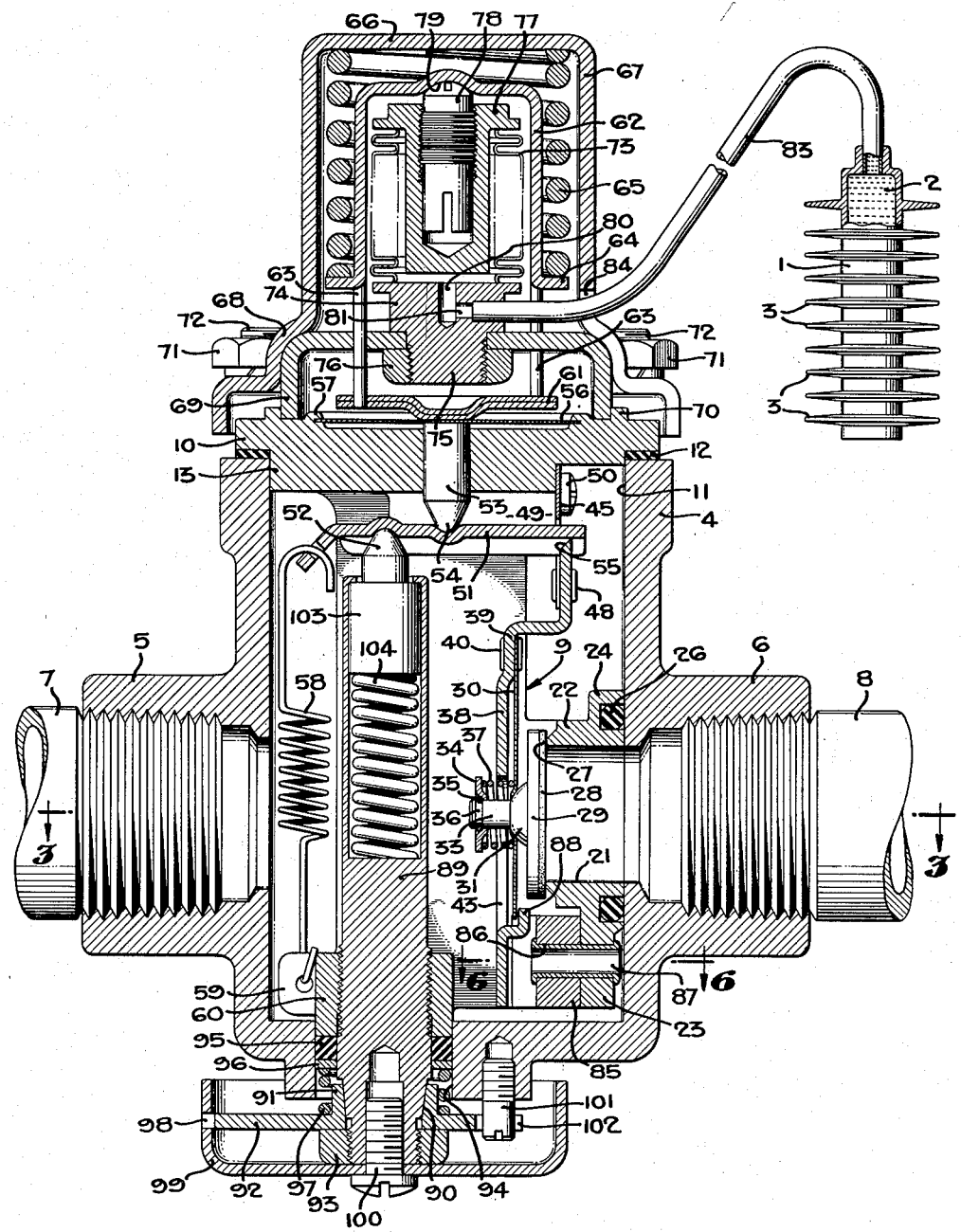
Figure 1 is a vertical section of a valve structure incorporating the invention, and which is connected with a device that is sensitive to temperature changes, the valve being in closed position.

In the form of the invention illustrated in Figs. 1 to 7, inclusive, a valve structure is shown for the control of the flow of gaseous fuel to a burner. The valve is ordinarily controlled by the aid of a bulb 1 that carries a volatile liquid 2. The bulb 1 is arranged to respond to variations in temperature in a space, such as a room, or the like. In order that the changes in temperature may affect the liquid 2, the bulb 1 may, if desired, be provided with fins 3. By proper choice of material of bulb 1 and fins 3, heat transfer from the circumambient atmosphere to the liquid 2 is readily effected.

An increase in temperature at the bulb 1 causes a corresponding pressure increase exerted by the liquid 2 in a closed system which will hereinafter be described. Similarly, a reduction in temperature causes a reduction in pressure exerted by the liquid 2.

A valve structure is controlled by the aid of these variations in pressure. Thus, when the space requires more heat, the valve structure is opened; and, when less heat is required, the valve structure is closed. Adjustment can be such that a few degrees Fahrenheit differential at the bulb 1 may effect opening and closing of the valve.

The valve structure includes a valve body 4 which has bosses 5 and 6, through which conduits or ports extend. Either one of these conduits may form an inlet opening. In the present instance, the inlet can be formed through boss 5. Threaded into the opening 5 is a pipe or conduit 7, and a similar outlet conduit 8 is threaded into the boss 6.

In order to make it possible to adjust and test all of the operating parts of the valve mechanism, the body 4 is constructed in such manner that it serves virtually only as a housing for the valve; and it removably supports the valve mechanism which may be renewed and replaced as desired.

Thus, a cage structure 9 (see, particularly, Figs. 4 and 5) is provided. This cage provides a support not only for the valve closure mechanism, but also for the port and the seat with which the valve closure mechanism cooperates.

The upper end of the cage 9 is formed with a circular covering flange 10 that overlies the vertical cylindrical opening 11 formed in the valve body 4. This circular opening 11 has an axis transverse to the axes of conduits 7 and 8. All of the operating parts of the valve may be withdrawn through this cylindrical opening 11 by moving the covering flange 10 upwardly. A gasket 12 is interposed between the flange 10 and the top of the body member 4 in order to seal the opening at this point.

Fitting within the cylindrical opening 11 is a downwardly extending portion 13 that has a cylindrical surface engaging within the opening 11 and which serves as a guide. A pair of legs 14 and 15 extend downwardly from the flange 10 and provide parallel spaced vertical surfaces 16 and 17, as well as exterior cylindrical surfaces 18 and 19 that are in close juxtaposition to the cylindrical opening 11. These cylindrical surfaces form additional guides and supports for the cage 9. The legs 14 and 15 are furthermore joined at the bottom by a cross strap 20 (see, particularly, Fig. 3).

Figure 4:
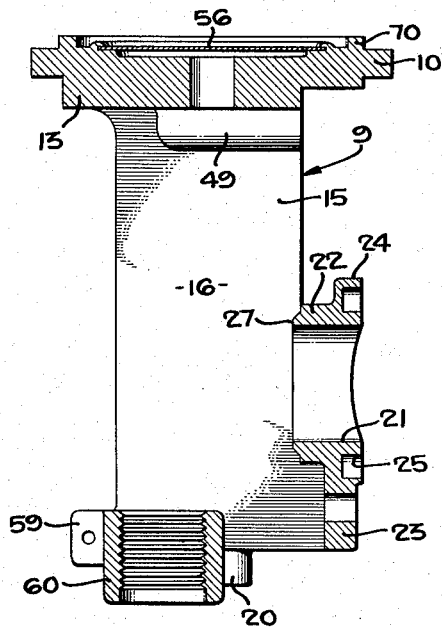
Fig. 4 is a vertical sectional view of a cage structure utilized with the valve shown in Figs. 1, 2 and 3.
Figure 5:
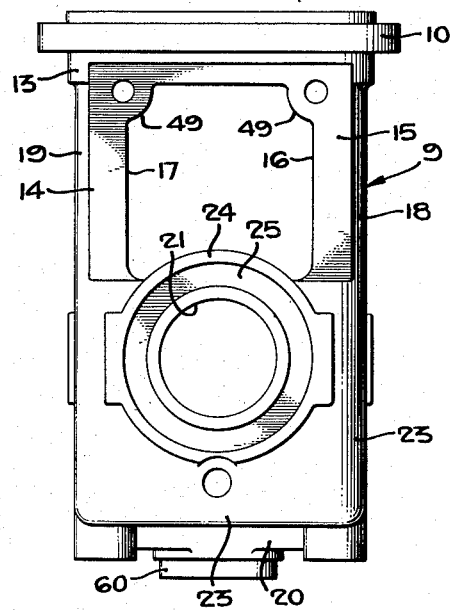
Fig. 5 is a side elevation of the cage.

An outlet port 21 is formed through a boss 22 that is located between legs 14 and 15. This boss 22, as shown most clearly in Figs. 4 and 5, is integral with the cage 9 and is supported by the aid of a cylindrical wall 23 extending across the lower portion of the legs 14 and 15. This cylindrical wall 23, as shown most clearly in Fig. 6, is spaced inwardly of the opening 11. However, the boss 22 has a flange 24 that is provided with a cylindrical surface adapted to be in close juxtaposition to the cylindrical opening 11. This flange carries an annular groove 25. In this groove is disposed a sealing member, such as an O ring 26, contacting and sealing against the inner wall 11.

In this way, the outlet port 21 is placed in alignment with the outlet conduit 8. Removal of the cage 9 and its associated structure from body 4 can be readily effected without interference.

The left-hand edge of the boss 22 forms a narrow valve seat 27. Cooperating with this valve seat is a closure structure including a yielding closure disc 28. This yielding disc is mounted upon a rigid disc 29 in any appropriate manner. The disc 29 is mounted upon a leaf spring 30 in a manner now to be described. This leaf spring 30 is shown most clearly in Fig. 7.

Thus, carried by the disc 29 is a boss 31 having a spherical surface. This boss 31 seats in the corresponding spherical recess or seat formed in the spring 30. A flange 34 is removably mounted upon the outer end of stem 33, as by the aid of a spring ring 35. This spring ring 35 is accommodated in the annular groove 36 in stem 33 and the inwardly extending inner edge of a flange ring 34. A compression spring 37 extends between the flange 34 and the spring 30. Spring 37 keeps the boss 31 seated in the spring 30; but since the stem 33 passes through a large clearance hole at the bottom of the spherical seat, angular movement of the axis of stem 33 is permitted.

By this mounting of the closure member 28 a universal movement is obtained which permits the closure disc 28 to rest upon the seat 27 and to align itself accurately with that seat without any drag of the closure with respect to the seat.

The leaf spring 30 is mounted upon an arm 38. For this purpose, leaf spring 30 has a horizontal upper portion 39 fastened to the arm 38 by the aid of hollow rivets 40. These hollow rivets 40 pass through the aligned apertures 41 in the leaf spring, and apertures 42 of the arm 38. An opening 43 is provided in the arm 38 for permitting the stem 33 and its associated parts to pass through the arm 38. As shown most clearly in Figs. 3 and 7, the spring 30 has the projections 44 on each side thereof to contact with the inner right-hand surface of the arm 38. In this way, when arm 38 moves to the closed position of Fig. 1, there is positive contact between the arm 38 and the spring 30 in order to urge the closure 28 to closed position.

The arm 38 is pivotally mounted upon the cage 9. For this purpose a spring hinge 45 is utilized having a pair of depending spaced legs 46. These spaced legs 46 carry apertures cooperating with apertures 47 (Fig. 7) for the passage of the hollow rivets 48, for fastening arm 38 to hinge 45. The horizontally extending portion of the spring hinge 45 is mounted upon the bosses 49 (Fig. 5) extending below the projection 13. This is effected by the aid of the screws 50 that are threaded in apertures located in the bosses 49 below this projection.

Figure 2:
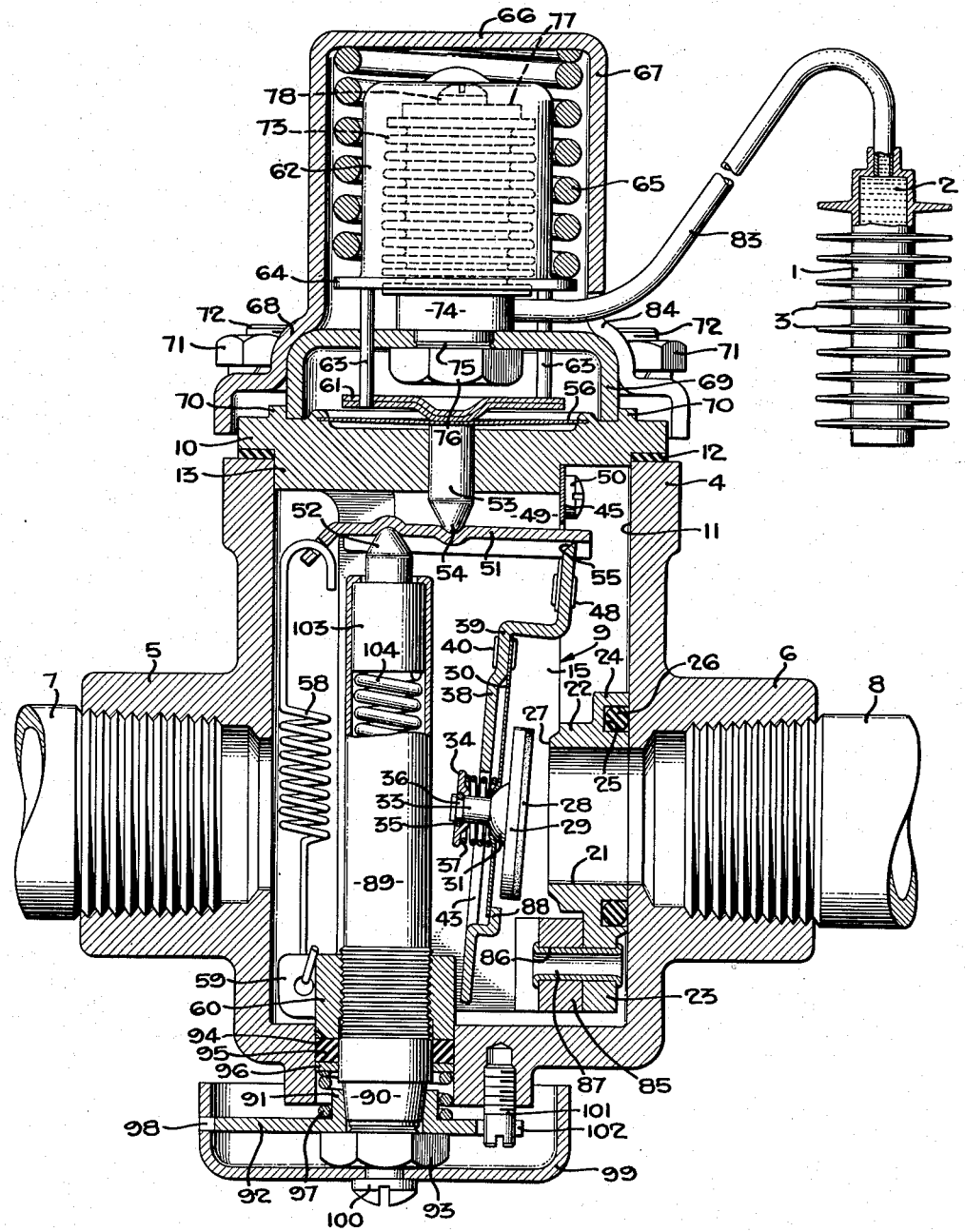
Fig. 2 is a view similar to Fig. 1, but illustrating the valve in fully opened position.

The arm 38 can be swung against the force of hinge 45 to the open position of Fig. 2 by the aid of the lever 51. This lever 51 rests upon a rounded conical pivot or fulcrum point 52 that is accommodated in a recess in the left-hand portion of the lever 51. The manner in which this conical pivot point 52 is supported will be described hereinafter.

Spaced from the conical pivot point 52 is an actuator 53. This actuator 53 is in the form of a post having a lower rounded conical actuating portion 54 that is accommodated in a recess in the lever 51. The post 53 may be cylindrical, and is guided through an appropriate aperture in the cover flange 10.

The lever 51 has side flanges in order to obtain rigidity. Its right-hand end extends between the spaced legs of hinge 45, and contacts a knife edge 55 formed on the upper edge of the arm 38.

The lever 51 is urged in a counter-clockwise direction by the aid of a tension spring 58. This tension spring is anchored in the right-hand end of the lever 51. Its lower end is anchored in an ear 59 formed on one side of a boss 60 integral with the cage 9.

Downward movement of the lever 51 about its fulcrum causes clockwise rotation of the arm 38. An extreme open position is shown in Fig. 2, in which the arm 38 is moved a considerable distance in a clockwise direction. The valve is then opened.

The knife edge bearing 55 is placed slightly to the right of the spring hinge 45 and, accordingly, there is provided a short lever arm for multiplying the motion of the arm 38 toward open position.

The actuator 53 is urged downwardly to open the valve when there is a sufficient reduction in temperature in the circumambient atmosphere at bulb 1. Upon an increase in temperature, the actuator 53 is permitted to move upwardly.

Movement of the actuator 53 is effected by mechanism mounted above the covering flange 10. Thus, a flexible diaphragm 56 extends above the actuator 53 and its lower surface is in contact therewith.

This flexible diaphragm is anchored in the top of the flange 11 by the aid of the upset flange 57 that is turned inwardly to hold the diaphragm 56 in place.

Extending across the diaphragm 56 is a transverse arm 61. The central portion of this arm is somewhat depressed in order to contact the upper surface of the diaphragm 56. However, the arm 61 is not fastened to the diaphragm. In this way, it is possible to remove the mechanism above the diaphragm 56 without removing other parts of the mechanism.

The arm 61 is joined to the lower open end of a cylindrical shell 62, as by the aid of the struts 63 engaging opposite ends of the arm 61. These struts 63 may be formed integrally with the shell 62.

The shell 62 has a lower flange 64 for the accommodation of a relatively heavy compression spring 65. This compression spring 65 thus imposes a downward force upon the arm 61 and the actuator 53 through the diaphragm 56. The upper end of the spring is in contact with the upper wall 66 of a housing 67. This housing 67 is provided with an enlarged bell 68. This bell contacts the upper corner of a flanged supporting member 69. The lower edge of this flange contacts the top of the covering member 10 and is positioned with respect to this covering flange by an upwardly directed guide flange 70 on the cover member. The housing 67 is held securely in place by the aid of the fastening means 71 which attaches the housing to the body 4 by the aid of threaded studs 72 that are disposed around at the upper end of the casing 4. Thus, by fastening the housing 67 in place, the spring 65 is confined between the lower flange 64 and the upper wall 66. At the same time, the member 69 is clamped firmly in place.

The force of the spring 65, acting downwardly to move the actuator 53, is opposed by the expansion of liquid 2. For this purpose the supporting member 69 carries a corrugated expansible metal bellows 73 which is in communication with the bulb 1 in a manner to be hereinafter described. This metal bellows is attached at its bottom to a stationary post 74 that has a threaded extension 75. This threaded extension passes through a central aperture of the supporting member 69, and a nut 76 holds the post 74 firmly in place upon this supporting member 69.

The upper end of the bellows 73 is closed by a plug member 77 in which an adjustable screw 78 is threaded. The upper side of the screw is rounded to fit into a recess 79 formed in the top of the shell 62. Communication with bulb 1 is effected from the bottom of the bellows 73 by way of ports 80 and 81 in post 74, and a flexible tube or conduit 83. This conduit 83 is attached at its left-hand end in sealing relation into post 74. It passes through a slot 84 in the side of the housing 67. Its other end is firmly secured into the top of bulb 1.

The liquid 2 completely fills all of the closed space formed by the bellows 73 and the bulb 1.

When the temperature increases at the bulb 1, the bellows 73 expands upwardly. Since the screw 78 is in contact with the top of the shell 62, the spring 65 is compressed. This relieves the force on actuator 53, and the tension spring 58 moves the lever 51 in a counter-clockwise direction to cause the closure structure to move toward closed position. On the other hand, when the temperature is sufficiently decreased, the bellows 73 contracts; and the force of the spring 65 is sufficient to urge the actuator 53 downwardly, and thereby to rotate the arm 38 in a clockwise or opening position.

The seeking of a balance between the opposing forces due to the spring 65, and to the pressure in bellows 73 thus determines the position of the valve closure structure. Compression of the bellows ultimately results in opening of the valve as indicated in Fig. 2.

Since the bulb 1 is at a distance from the valve structure, the temperature at the bellows 73 may be slightly different from that at the bulb 1. Since the bellows 73 is in good heat transfer relation to the circumambient atmosphere, an error in valve operation may occur due to this temperature differential. By the present arrangement such errors are substantially compensated. Thus, the arm 61, which serves to transmit the force from the shell 62 to the actuator 53, is formed of a bimetal strip. Upon a rise in temperature at or near the bellows, the ends of the arm 61 are urged downwardly about the central depressed portion due to the bimetal action. This produces a force counteracting any increment of pressure due to the rise in temperature at the bellows. On the other hand, a reduction in temperature causes the ends of the arm 61 to move upwardly to counteract the reduced pressure in the bellows 73.

Means are provided to produce a snap opening action. For this purpose a horseshoe permanent magnet 85 is supported below the boss 22, as shown most clearly in Figs. 1, 2, 6, and 7. This permanent magnet has a central aperture 86 through which a hollow rivet 87 passes to attach this permanent magnet to the cage 9. The arm 38 is made from magnetic material so that it is attracted by magnet 85. However, there is a small air gap (Fig. 6) between the arm 38 and the poles of the permanent magnet 85. This air gap is determined by the positive contact between the spring 30 and the arm 38 provided by the projections 44. When the valve closure disc 28 is seated, the lower end of the arm 38 is not quite in contact with the permanent magnet 85. In this way, sticking is prevented.

Upon a sufficient force being exerted to move the arm 38 in a clockwise or opening direction, the force of the permanent magnet 85 is ultimately overcome in a sudden manner and the valve is snapped open.

Provisions are also made to ensure that the valve closure disc 28 will not go through a gradual closing pressure, through zero value. Thus temporary leaks are prevented. The closure 28 moves quickly away from its seat 27 when the valve opens. For this purpose, the arm 38 has an inwardly turned abutment 88. The inner surface of this abutment 88 is out of contact with the free or lower end of the spring 30 when the valve is closed. Accordingly, until arm 38 moves away from the magnet 85 by a distance corresponding to the clearance between abutment 88 and the spring 30, the disc 28 remains seated by the pressure of spring 30. Then, the spring 30 is positively actuated by the arm 38.

Adjustment of the temperature range can be effected to some extent by adjustment of the screw 78 in the plug 77. Further adjustment is obtained by adjusting the vertical height of the fulcrum member 52. For this purpose the fulcrum member is carried by a post 89. The lower end of this post is threaded into the boss 60. The post carries, furthermore, a tapered surface 90 over which fits a correspondingly tapered hub 91 of a disc 92. A nut 93, threaded on the lower end of the post 89, serves to hold this disc 92 in firm frictional engagement with the post.

The boss 60 projects into an aperture 94 in the bottom of the body 4. The axis of this aperture is also transverse to the axis of conduits 7 and 8, so that the entire assembly, except for the adjusting members attached to the lower end of the post 89, may be removed as a unit with the cage 9.

In order to provide a seal around the aperture 94, a yielding packing washer 95 surrounds the post 89, and a metal washer 96 is disposed over it. A compression spring 97 serves to compress the packing washer 95 against the bottom of boss 60.

The disc 92 is used for manual adjustment exterior of the body 4 of the fulcrum member 52. For this purpose the disc 92 has a radial projection 98 extending into an aperture in the upwardly turned flange of handle member 99. This handle member is attached to the bottom of the post 89 by the aid of screw 100. Limits to the adjustment are provided by a stop member 101 in the form of a headless screw threaded into the body 4. This stop member 101 extends across an arcuate peripheral groove 102 in the disc 92. This groove may extend for, say, 180°, in order to permit about a half turn of the handle 99. Turning of the handle 99 causes the post 89 to rise or fall within the threaded boss 60, causing a corresponding rise or lowering of the fulcrum member 52.

In the present instance, provisions are made to ensure against the transmission of too great a force upon the lever 51 by the actuator 53. For this purpose the fulcrum member 52 is not rigidly joined to the post 89. Instead, it is formed on the top of a stem 103 telescoping within the hollow upper part of the post 89. The upper end of the hollow portion can be turned over to provide an abutment for the stem 103. A heavy compression or strain spring 104 is interposed between the bottom of the stem 103 and the bottom of the hollow portion of post 89. When an excessive force is exerted upon the actuator 53, the fulcrum member 52 is urged downwardly to compress the spring 104. Thereby, injury to the valve parts is prevented. However, during normal operation, the spring 104 exerts a force strong enough to maintain the fulcrum member 52 stationary.

Assuming that the bulb 1 is exposed to the upper limit of temperature, the bellows 73 are expanded and spring 65 is compressed so as to permit the tension spring 58 to bring the valve into the closed position of Fig. 1. Upon a definite lowering of the temperature, the bellows 73 contracts, spring 65 is allowed to expand, and actuator 53 moves downwardly to cause opening of the valve to the position of Fig. 2. This opening is effected by a snap action. The point at which this opening is effected is controllable by adjusting the vertical position of the post 89.

Figure 12:
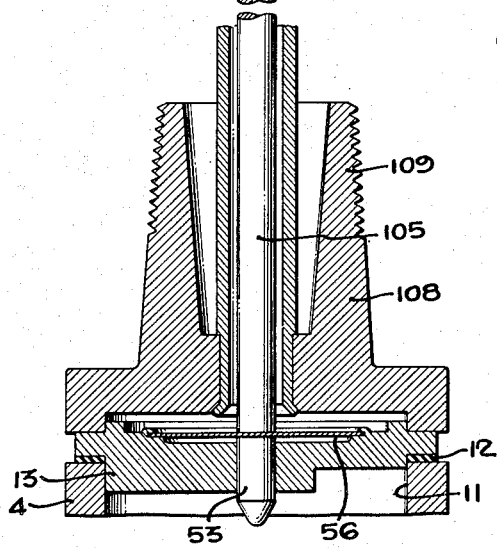
Fig. 12 is a fragmentary view of a further modified form of the invention.
Figure 8:
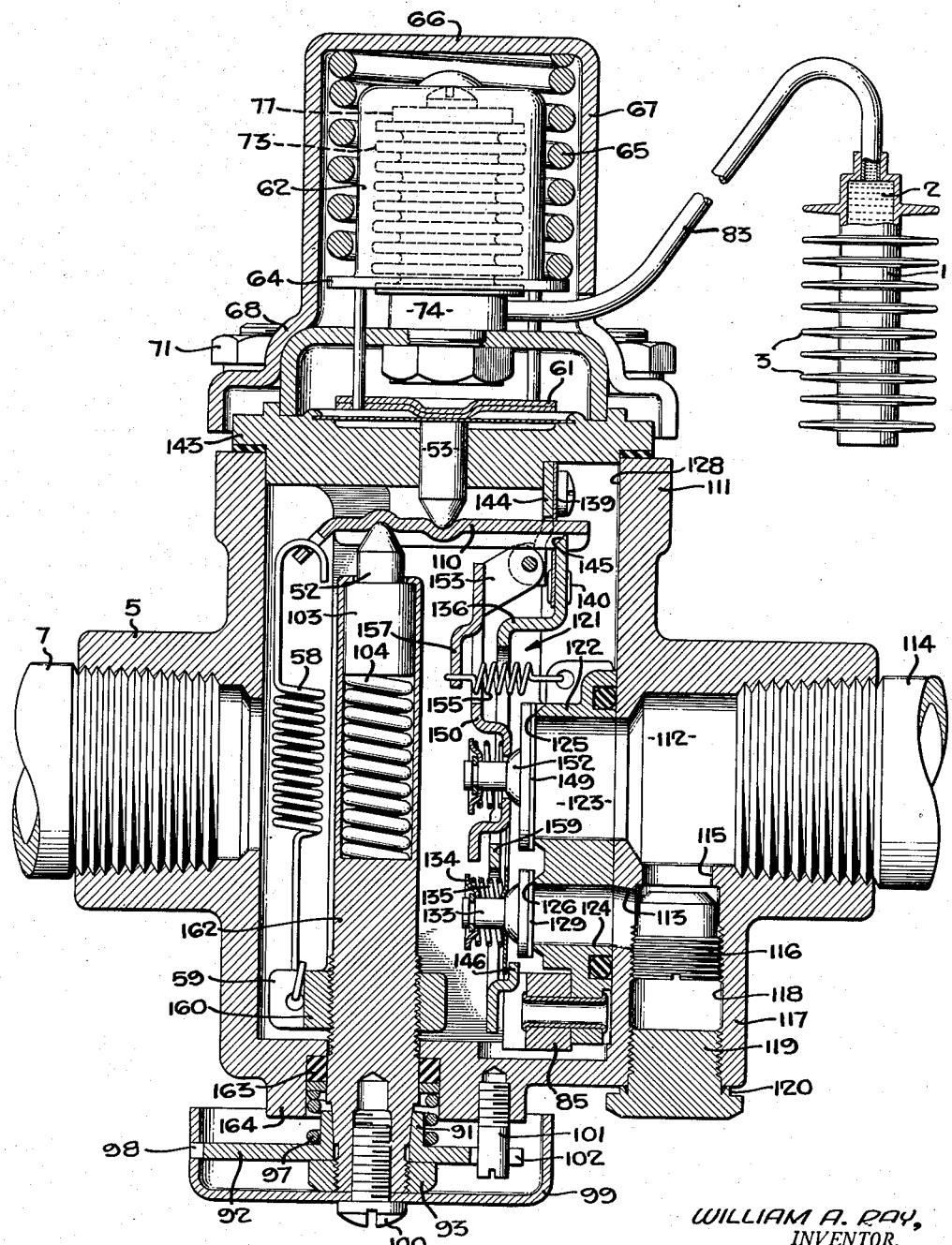
Fig. 8 is a view, similar to Fig. 1, of a modified form of the invention.

In the form of the invention just described, the temperature of a space, such as a room, controls the opening and closing of a valve. In the form shown in Fig. 12, the arrangement is such that the temperature of water in a water heater controls the opening and closing of the valve. In this form the actuator 53 operates in the same manner as before. However, its position is affected by a rod 105. The lower end of this rod rests upon the flexible diaphragm 56. Its upper end is threaded into a cap 106. This cap 106, in turn, is threaded into a hollow expansible tube 107. The lower end of this hollow expansible tube is rigidly fastened to a cap 108. The cap 108 carries a nipple 109 surrounding the tube 107, and is adapted to be threaded into a water heater. The water in the heater serves to heat the expansible tube 107 and, thereby, to expand it.

Upon expansion of tube 107, the rod 105 is moved upwardly to permit the valve to close. A contraction of the tube 107 urges the rod 105 downwardly to open the valve.

In other respects this modification operates in a manner entirely similar to that heretofore described.

In the forms heretofore described, the valve is opened or closed in response to temperature changes. In the form shown in Figs. 8, 9, 10 and 11, a valve structure is provided in which the opening occurs in two stages. For this purpose there are two valve units, one serving for low fire, and the other serving to open later to provide a high fire condition.

In so far as the temperature control by the aid of a bellows or expansion rod is concerned, this may be substantially identical to those forms heretofore described. The actuator 53, as before, operates a lever 110 arranged in substantially the same manner as before. In this case, however, the valve body 111 is provided with two openings 112 and 113. Opening 112 proceeds directly to the outlet pipe 114 and corresponds to a high fire opening. The other, smaller opening 113 corresponds to a low fire opening, and is in communication with the pipe 114 through a port 115. The opening of this port is controlled by an adjusting screw 116 threaded into a boss 117 integral with the body 111. The opening 118 in which the screw 116 is located can be closed and sealed by a screw 119 which has the sealing flange 120.

The cage 121 is similar to cage 9. However, the boss 122 is now elongated in order to provide a large valve port 123, as well as a smaller lower fire valve port 124. These ports are provided with valve seats 125 and 126, shown most clearly in Figs. 9 and 10. Ports 123 and 124 are in registry, respectively, with the openings 112 and 113. A sealing O ring 127 extends around both of the ports 123 and 124 to seal against the interior cylindrical surface 128 of the body 111.

As before, the yielding valve closure disc 129 for the low-fire valve is mounted on a metal disc 131 having a spherical surface that is received in a spherical seat 132 of a leaf spring 130 (see Fig. 11). The stem 133 carries a flange 134 against which the left-hand end of the spring 135 rests. This spring 135 thus serves to hold the spherical member 131 in its spherical seat 132.

In this instance, the leaf spring 130 is provided with a pair of spaced legs that are attached to the sides of the operating arm 136, as by the aid of hollow rivets passing through apertures 137 of the spring, and 138 of the arm 136. This arm is mounted upon a spring hinge 139, shown most clearly in Fig. 11, as by the aid of the hollow rivets 140. These hollow rivets 140 pass through apertures 141 of the arm 136 and apertures 142 of the spring hinge 139. The spring hinge 139 is fastened to the covering flange 143 of the cage 121. Interposed between the hinge 139 and the cover flange 143 is a bracket 144 for supporting the high fire valve closure structure.

The arm 136 is provided with a knife edge 145 that is contacted by the right-hand end of the operating lever 110. As in the first form described, a permanent magnet 85 provides a snap action for opening the low fire valve closure 129. Also, the arm 136 carries the abutment 146 that cooperates with the free lower end 147 of the leaf spring 130.

Upon an initial reduction in temperature, the low fire valve closure is snapped open and assumes the position of Fig. 9. However, upon continued demand for still more heat, the arm 136 moves still further to the right and causes the opening of the high fire valve closure disc 149 to the position indicated in Fig. 10. This closure disc 149 cooperates with the seat 129. This closure disc and its supporting elements are identical with those described in connection with closure disc 129, except that the closure disc 149 is larger to fit the larger opening of port 123.

This closure disc 149 is mounted upon an arm 150. For this purpose, the arm 150 has an aperture or seat 151 into which the spherical member 152 of the closure structure is received. Furthermore, the arm 150 is so arranged that it projects through the opening 152 of the main arm 136. Arm 150 is pivoted by the aid of ears 153 to the ears 154 of bracket 144. The arm 150 is urged resiliently to the closed position by the aid of a tension spring 155. This spring 155 has its right-hand end engaged in ear 156 mounted on the boss 122. Its left-hand end embraces projection 157 formed integrally with the arm 150.

The arm 150 has an offset, downwardly extending projection 158 that is in the path of movement of the cross strip 159 of arm 136. In the closed position of Fig. 8, the strip 159 is spaced from the extension 158. When the low fire valve closure 129 is opened, the strip 159 moves to a position where it contacts the projection 158. The spring 155, however, is strong enough at this stage to keep the high fire valve closed. Continued movement of the arm 136 upon the demand for fuel causes the supplemental arm 150 to be moved in a clockwise direction about its pivot and gradually to open the high fire valve closure 149. This position is indicated in Fig. 10.

Since the low fire valve closure 129 is opened by snap action, the high fire valve 149 acts as a throttle valve, and the degree of opening depends upon the expansion of the compression spring 65. As before, a compensating bimetal arm 61 is provided to compensate for temperature differentials at the bellows and the bulb 1.

The fulcrum member 52 is adjustable in substantially the same manner as before. In this case, however, the boss 160 is not telescoped into an opening in body 111. Instead, the adjustable post 162 extends through a clearance aperture therein, and a packing washer 163 is accommodated in the boss 164 extending downwardly from the body member 111. In other respects, the adjustment mechanism is the same as described in connection with Figs. 1 and 2.

The inventor claims:

1. In a valve structure: a valve body having an inlet conduit and an outlet conduit, as well as openings at opposite ends of the body and having axes transverse to the axis of one of the conduits; a cage having a cover portion sealing one of the openings; said cage also having another portion inserted within the other opening; an arm hingedly supported by the cover portion; means forming an aperture and a valve seat around the aperture and carried by the cage, said aperture being in alignment with said one of the conduits; a valve closure member carried by the arm and cooperating with the seat; a lever for operating the arm; an adjustable pivot for the arm and supported by said other portion; and means exterior of the body for adjusting said pivot.

2. In a valve structure: a valve body having an inlet conduit and an outlet conduit, as well as openings at opposite ends of the body and having axes transverse to the axis of one of the conduits; a cage having a cover portion sealing one of the openings; said cage also having another portion inserted within the other opening; an arm hingedly supported by the cover portion; means forming an aperture and a valve seat around the aperture and carried by the cage, said aperture being in alignment with said one of the conduits; a valve closure member carried by the arm and cooperating with the seat; a lever for operating the arm; an adjustable pivot for the arm and supported by said other portion; means exterior of the body for adjusting said pivot; and means supported by the cover portion and exterior of the body for moving said lever.

3. In a valve structure: a valve body having an inlet conduit and an outlet conduit, as well as openings at opposite ends of the body and having axes transverse to the axis of one of the conduits; a cage having a cover portion sealing one of the openings; said cage also having another portion inserted within the other opening; an arm hingedly supported by the cover portion; means forming an aperture and a valve seat around the aperture and carried by the cage, said aperture being in alignment with said one of the conduits; a valve closure member carried by the arm and cooperating with the seat; a lever for operating the arm; an adjustable pivot for the arm and supported by said other portion;

means exterior of the body for adjusting said pivot; sealing means between the cover portion and the body; and sealing means carried by the cage and disposed around the aperture.

4. In a valve structure: a hollow valve body having an inlet conduit and an outlet conduit as well as openings at opposite ends of the body, the axes of said openings being transverse to one of the conduits; a removable cage fitted within the body and having a cover portion for one of the openings as well as a hub fitting into the opposite opening; sealing means between the cover portion and the body; means carried by the cage, forming an aperture in registry with one of the conduits and also forming a valve seat; sealing means between the edge of the said conduit and the aperture; an arm; a closure member carried by the arm; a movable connection between the arm and the cover member; a lever for moving the arm about a pivot; means forming a fulcrum for the arm and adjustably mounted in said hub; adjusting means exterior of the body for said fulcrum forming means; a flexible diaphragm on the exterior of the cover; and an actuator guided in the cover for the lever.

5. In a valve structure: a hollow valve body having an inlet conduit and an outlet conduit as well as openings at opposite ends of the body, the axes of said openings being transverse to one of the conduits; a removable cage fitted within the body and having a cover portion for one of the openings as well as a hub fitting into the opposite opening; sealing means between the cover portion and the body; means carried by the cage, forming an aperture in registry with one of the conduits and also forming a valve seat; sealing means between the edge of the said conduit and the aperture; an arm; a closure member carried by the arm; a movable connection between the arm and the cover member; a lever for moving the arm about a pivot; means forming a fulcrum for the arm and adjustably mounted in said hub; adjusting means exterior of the body for said fulcrum forming means; a flexible diaphragm on the exterior of the cover; an actuator guided in the cover for the lever; and temperature responsive means exterior of the body for flexing said diaphragm and thereby moving said actuator.

6. In a valve structure: means forming a valve seat; a valve closure member having a closure surface cooperating with the seat; a leaf spring carrying the closure member; said leaf spring having a spherical seat cooperating with a spherical surface of the closure member that is opposed to the closure surface, said closure member having universal movement with respect to the seat; a stem attached to the closure member and passing through a clearance aperture in the spherical seat, means cooperating with the stem for resiliently holding the closure in the spherical seat; and means for moving the spring to open and close the valve.

7. In a valve structure: means forming a valve seat; a valve closure cooperating with the valve seat; a leaf spring carrying the closure; said leaf spring resiliently urging the closure against said seat; an operating arm to which the leaf spring is attached at one end of the spring; the other end of the spring being free when the closure is seated; and means carried by the arm for engaging said free end upon a substantial increment of movement of the arm in valve opening direction.

8. In a valve structure: means forming a valve seat; a valve closure cooperating with the valve seat; a leaf spring carrying the closure; said leaf spring resiliently urging the closure against said seat; an operating arm to which the leaf spring is attached at one end of the spring; the other end of the spring being free resiliently to urge the closure against said seat when the closure is seated; and means carried by the arm for engaging said free end upon a substantial increment of movement of the arm in valve opening direction; said arm and spring having engaging surfaces urging the spring toward valve closing position upon movement of the arm past valve closing position.

9. In a valve structure: means forming a valve seat; a valve closure cooperating with the valve seat; a leaf spring carrying the closure; said leaf spring resiliently urging the closure against said seat; an operating arm to which the leaf spring is attached at one end of the spring; the other end of the spring being free when the closure is seated; means for operating the arm in valve opening direction; and yielding means overcome by said operating means for holding the arm in valve closing position.

10. In a valve structure: a body having an inlet conduit and an outlet conduit; a removable cage inserted within the body; and a valve mechanism entirely supported by the cage and comprising: means forming a valve port and a seat in communication with one of the conduits; sealing means between said valve port forming means and the body; a valve closure structure; means for pivotally mounting the valve closure structure on the cage; and condition responsive means separately attached to the cage for moving said valve closure structure.

11. In a valve structure: means forming a first valve seat and a second valve seat; a first valve closure cooperating with said first seat; a second valve closure cooperating with the second valve seat; a first pivotally movable arm carrying the first valve closure; magnetic means for holding said first arm in valve closing position; a second pivotally movable arm carrying the second valve closure; means yieldingly holding said second arm in closed position; means for moving said first arm; and means forming a lost motion connection between said first arm and said second arm and effective to move said second arm to second valve opening position only after said first arm has moved to open said first valve.

12. In a valve structure: a valve body having an inlet conduit and an outlet conduit, as well as an opening at one end of the body having an axis transverse to the axis of one of the conduits; a cage having a cover portion sealing said opening; an arm hingedly supported by the cover portion within the cage; means carried by the cage forming an aperture and a valve seat around the aperture, said aperture being in alignment with said one of the conduits; a valve closure member carried by the arm and cooperating with the seat; a lever for operating the arm; means forming an axially adjustable pivot for the arm and supported by the cage; and means exterior of the body for adjusting said pivot.

13. In a valve structure: a valve body having an inlet conduit and an outlet conduit, as well as an opening at one end of the body having an axis transverse to the axis of one of the conduits; a cage having a cover portion sealing said opening; an arm hingedly supported by the cage; means carried by the cage forming an aperture and a valve seat around the aperture, said aperture being in alignment with said one of the conduits; a valve closure member carried by the arm and cooperating with the seat; a lever for operating the arm; means forming an axially adjustable pivot for the arm and supported by the cage; and means exterior of the body for adjusting said pivot.

14. In a valve structure: means forming a valve seat; an operating arm; a leaf spring attached only at one end to said arm; a valve closure cooperating with the seat and carried by the leaf spring near its other end; the resilience of the spring being thus utilized for holding the closure against the seat; and means carried by the arm for engaging said other end to open the valve upon a substantial increment of movement of the arm in valve opening direction, said means being free of said other end while the arm is in valve closing position.

15. In a valve structure: means forming a valve seat; an operating arm; a leaf spring attached only at one end to said arm; said spring having a spherical socket adjacent the other end of the spring; a valve closure cooperating with the valve seat and seated in said socket; resilient means urging said closure into the socket and maintaining said closure in said seat for all positions of said spring; the resilience of the spring being thus utilized for holding the closure against the valve seat; and means carried by the arm for engaging said other end to open the valve upon a substantial increment of movement of the arm in valve opening direction, said means being free of said other end while the arm is in valve closing position.

16. In a valve structure: a valve body having wall means defining a chamber open at one end as well as inlet and outlet passages for the chamber; a cage structure insertable in said chamber opening; means detachably mounting said cage on said body; a flexible diaphragm secured to said cage independently of said mounting means, said diaphragm, together with said cage, sealing said chamber opening; a closure structure cooperable with one of the passages carried by the cage for controlling flow of fluid through the body; a mechanism for operating the closure structure and carried by the cage; yielding means biasing the mechanism for causing the closure structure to assume a limiting position; an operator carried by the cage and movable transverse to said diaphragm for operating the mechanism to cause the closure structure to move away from said limiting position; and an actuator detachably mounted on the body and movable to depress the diaphragm for moving the operator; and condition responsive means for so moving the actuator.

17. In a valve structure: a body having an inlet conduit and an outlet conduit; and a removable cage inserted within the body; a valve mechanism entirely supported by the cage and comprising: means forming a valve port and a seat in communication with one of the conduits;

sealing means between said valve port forming means and the body; a valve closure structure; means for pivotally mounting the valve closure structure on the cage; a lever; means forming a pivot for said lever, said pivot forming means defining an axis of movement of said lever spaced from the axis of movement of said valve closure structure; said lever being engageable with said closure mounting for moving said valve closure about its pivotal mounting; movable means responsive to a condition exterior of the valve for moving said lever, said lever moving means being carried by the cage exteriorly of said chamber; and means available exteriorly of the body for adjusting the position of the pivot to vary the amount of movement of said condition responsive means required to operate said lever.

18. In a valve structure: a valve body having a chamber and inlet and outlet passages for the chamber; a valve closure for one of the passages; a leaf spring; means securing said leaf spring at one end thereof to the body; the other end of said leaf spring being free; an arm secured to said free end of said leaf spring and mounting said closure, said arm having means forming a knife edge spaced from said securing means; a lever engaging said knife edge for flexing said leaf spring to move said closure with respect to said seat; and condition responsive means for moving said lever.

WILLIAM A. RAY.

References Cited in the file of this patent

UNITED STATES PATENTS

| Number | Name | Date |
|---|---|---|
| 1,058,102 | Ricketts | Apr. 8, 1913 |
| 1,103,667 | Fulwieler | July 14, 1914 |
| 1,208,130 | Fulton | Dec. 12, 1916 |
| 1,216,116 | Hayward | Feb. 13, 1917 |
| 1,588,411 | Groble | June 15, 1926 |
| 1,640,243 | Lawler | Aug. 23, 1927 |
| 1,647,734 | Kelly | Nov. 1, 1927 |
| 1,671,178 | Cohen | May 29, 1928 |
| 1,693,842 | Grimes | Dec. 4, 1928 |
| 1,741,548 | Tyden | Dec. 31, 1929 |
| 1,875,511 | Shivers | Sept. 6, 1932 |
| 2,004,597 | Birtch | June 11, 1935 |
| 2,058,868 | Hansen | Oct. 27, 1936 |
| 2,089,848 | Hoferle | Aug. 10, 1937 |
| 2,121,977 | Newell | June 28, 1938 |
| 2,144,754 | Forbes | Jan. 24, 1939 |
| 2,216,531 | Homeyer | Oct. 1, 1940 |
| 2,237,399 | Waddell | Apr. 8, 1941 |
| 2,242,718 | Dynes | May 20, 1941 |
| 2,249,623 | Taylor | July 15, 1941 |
| 2,279,519 | Paquin | Apr. 14, 1942 |
| 2,290,093 | Burch | July 14, 1942 |
| 2,413,513 | Morrill | Dec. 31, 1946 |
| 2,484,156 | Dube et al. | Oct. 11, 1949 |

FOREIGN PATENTS

| Number | Country | Date |
|---|---|---|
| 404,009 | France | Oct. 8, 1909 |